(12) United States Patent
Im (10) Patent No.: US 6,902,310 B2
(45) Date of Patent: Jun. 7, 2005

(54) ILLUMINATION SYSTEM AND PROJECTION DISPLAY DEVICE EMPLOYING THE SAME

(75) Inventor: Yong-seok Im, Kyungki-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 188 days.

(21) Appl. No.: 10/353,948

(22) Filed: Jan. 30, 2003

(65) Prior Publication Data

US 2003/0147255 A1 Aug. 7, 2003

(30) Foreign Application Priority Data

Feb. 1, 2002 (KR) .................................. 10-2002-0005879

(51) Int. Cl.⁷ .............................................. G03B 21/20
(52) U.S. Cl. ........................ 362/558; 362/555; 362/551; 362/309; 362/268; 362/328
(58) Field of Search ................................ 362/558, 551, 362/231, 555, 553, 309, 268, 328, 240; 359/618, 15, 13

(56) References Cited

U.S. PATENT DOCUMENTS

| | | | |
|---|---|---|---|
| 3,525,566 A | 8/1970 | Altman | |
| 4,448,504 A | 5/1984 | Altman | |
| 4,711,578 A | 12/1987 | Chaimowicz | |
| 6,280,054 B1 | 8/2001 | Cassarly et al. | |
| 6,402,347 B1 * | 6/2002 | Maas et al. | 362/294 |
| 2001/0017674 A1 | 8/2001 | Yamaguchi | |
| 2001/0021023 A1 | 9/2001 | Ishikawa | |
| 2001/0048560 A1 | 12/2001 | Sugano | |

FOREIGN PATENT DOCUMENTS

DE 197 18 933 A1 10/1998

* cited by examiner

Primary Examiner—Stephen Husar
Assistant Examiner—Anabel Ton
(74) Attorney, Agent, or Firm—Burns, Doane, Swecker & Mathis, L.L.P.

(57) ABSTRACT

A compact illumination system using a light source such as an array of light emitting diodes (LEDs) or laser diodes (LDs) having a long life span, and a projection display device employing the illumination system are provided. The illumination system includes a light source; a collimating lens array for making light emitted form the light source be parallel; an optical path conversion unit for reflecting the light incident in parallel from the collimating lens array back toward the light source to initially converge the light; and a secondary focusing lens disposed at a side where the light source is positioned, for converging the light, that has been reflected and converged through the optical path conversion unit, on a predetermined position. The illumination system reflected the light emitted from the light source back toward the light source through the optical path conversion unit so that the volumes of the illumination system can be greatly reduced to be compact.

35 Claims, 12 Drawing Sheets

ILLUMINATION SYSTEM AND PROJECTION DISPLAY DEVICE EMPLOYING THE SAME

CROSS-REFERENCE TO RELATED APPLICATIONS

This application claims the priority of Korean Patent Application No. 2002-5879, filed on Feb. 1, 2002, which is incorporated herein in its entirety by reference.

BACKGROUND OF THE INVENTION

1. Field of the Invention

The present invention relates to a compact illumination system utilizing a light source such as an array of light emitting diodes (LEDs) or laser diodes (LDs) consisting of longer life span in the case of a projection display device employing the illumination system.

2. Description of the Related Art

Figure 1:
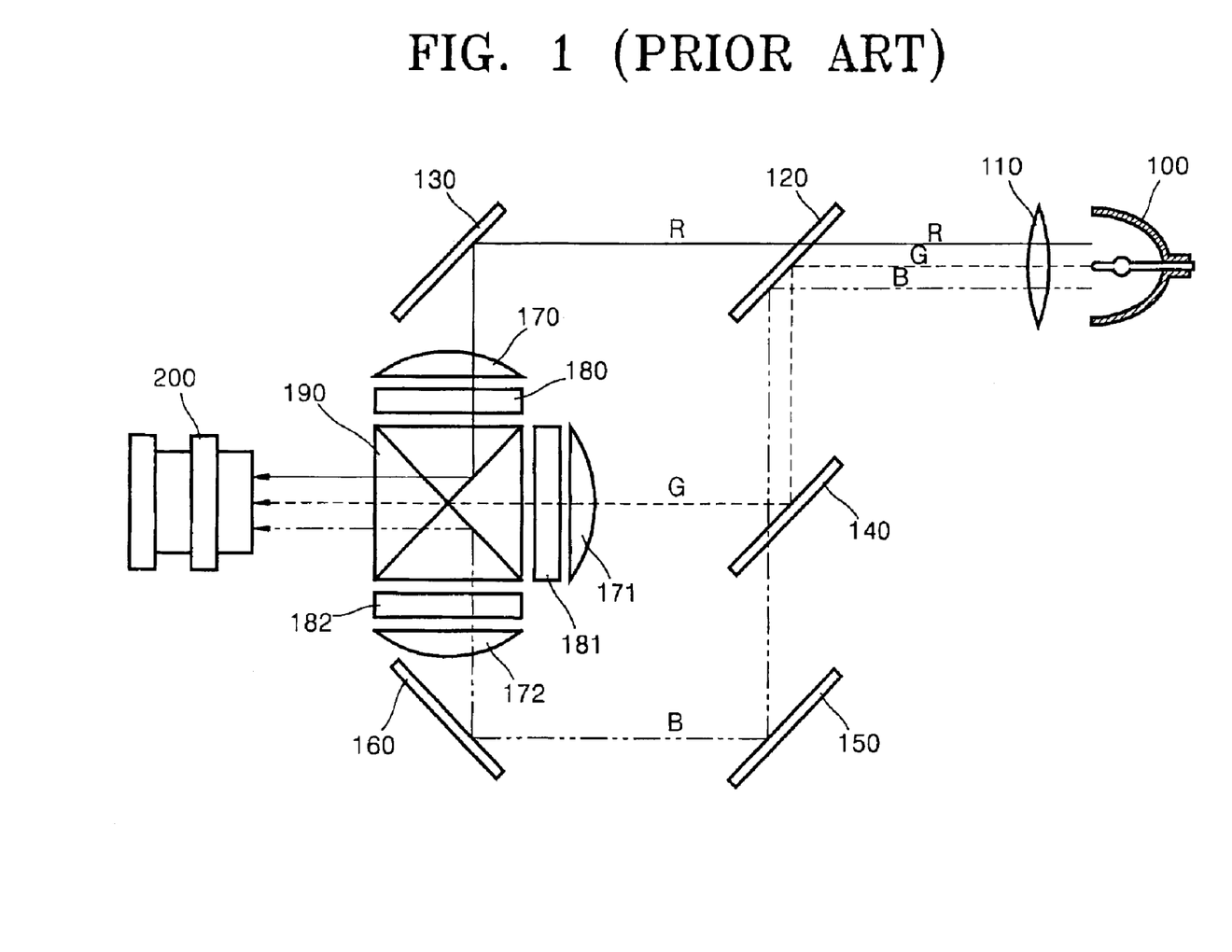
FIG. 1 is a schematic diagram of a conventional projection display device.

Referring to FIG. 1, a conventional projection display device includes a light source 100; a collimating lens 110 which makes a light beam emitted from the light source 100 parallel; light split units which split a white light beam from the collimating lens 110 into red (R), green (G), and blue (B) light beams, respectively; first through third liquid crystal display (LCD) panels 180, 181, and 182 which perform an on/off process on the R, G, and B light beams, respectively, forwarded from the light split units to form color images; a dichroic prism 190 which combines the R, G, and B light beams respectively transmitted through the first, second, and third LCD panels 180, 181, and 182; and a projection lens system 200 which magnifies and projects the image formed by the R, G, and B light beams on a screen (not shown).

The light split units include a first dichroic mirror 120, which transmits the R light beam in the white light beam emitted from the light source 100 and reflects the remaining G and B light beams, and a second dichroic mirror 140, which transmits the B light beam reflected from the first dichroic mirror 120 and reflects the G light beam reflected from the first dichroic mirror 120. In addition, the light split unit also includes a first mirror 130 which reflects the R light beam transmitted through the first dichroic mirror 120 on the first LCD panel 180, a second mirror 150 which reflects the B light beam transmitted through the second dichroic mirror 140, and a third mirror 160 which reflects the B light beam reflected from the second mirror 150 on the third LCD panel 182. Meanwhile, first, second and third focusing lenses 170, 171, and 172 are respectively disposed between the first through third mirrors 130, 140, and 160 and the respective first through third LCD panels 180, 181, and 182.

In a projection display device having the above-described structure, a white light beam emitted from the light source 100 is split into R, G, and B light beams, the R, G, and B light beams are processed by the respective first through third LCD panels 180, 181, and 182 according to previously input image signals to form different color images. The R, G, and B color images are combined into a single image through the dichroic prism 190, and the combined image is formed on the projection lens system 200 and magnified and projection on a screen.

The conventional projection display device utilizes, for example, a xenon lamp, a metal-halide lamp, or a UHP lamp as the light source 100. Such lamps generates heat of a high temperature of about 500° C. Thus, a separate cooling fan is used in order to cool the heat. However, this cooling fan is the principle cause of noise and disturbs users when the they are exposed to the hot air discharged from the cooling fan. Moreover, the lamps emits a large amount of ultraviolet rays and infrared rays which are harmful to the users. Thus, an optical filter for infrared rays and an optical filter for ultraviolet rays are required to prevent them from being emitted. Accordingly, the entire volume of the display device increases while the manufacturing cost also increases.

In addition, the lamps have a spectrum in which all wavelengths widely spread to thus have a narrow color gamut, thereby limiting color selection and degrading color purity. Moreover, the average life span of the lamps is short, which affects the stable use of the lamps.

SUMMARY OF THE INVENTION

To solve the above-described problems, it is an object of the present invention to provide a compact illumination system for preventing noise, heat, and harmful ultraviolet and infrared rays from being generated, thus extending the life span of a light source, and securing high power light, and a projection display device employing the illumination system.

Accordingly, to achieve the object of the present invention, there is provided an illumination system including a light source; a collimating lens array for making light emitted form the light source be parallel; an optical path conversion unit for reflecting the light incident in parallel from the collimating lens array back toward the light source to initially converge the light; and a secondary focusing lens disposed at a side where the light source is positioned, for converging the light, which has been reflected and converged through the optical path conversion unit, on a predetermined position.

The optical path conversion unit may include a Fresnel lens for converging the parallel light incident from the collimating lens array, and a mirror for converting a path of the light transmitted through the Fresnel lens toward the secondary focusing lens.

The Fresnel lens is separated from the mirror by a predetermined gap, and the gap is variable.

The optical path conversion unit may include an initial focusing lens having at least one convex side, and a mirror for converting a path of the light transmitted through the initial focusing lens toward the secondary focusing lens.

The initial focusing lens is separated from the mirror by a predetermined gap, and the gap is variable.

The optical path conversion unit may be realized as at least one convex plane and a reflective coating on the back.

The optical path conversion unit may be realized as a Fresnel lens including a reflective coating on the back thereof so that the parallel light incident from the collimating lens array is reflected and converged.

The optical path conversion unit may be realized as a holographic optical element.

The optical path conversion unit may be realized as a spherical concave mirror.

The illumination system further includes an optical fiber for leading the light that has been converged through the secondary focusing lens.

The light source is composed of light emitting diodes (LEDs) or laser diodes (LDs).

The light source has an array structure.

The light source includes a plurality of light emitters arranged in the array structure. The light emitters emit light of different wavelengths.

The collimating lens array may include a first cylindrical convex lens for compensating for a saggital plane of the light and a second cylindrical convex lens for compensating for a tangential plane of the light.

The collimating lens array may be realized as an aspherical fly-eye lens system.

The collimating lens array may includes a cylindrical convex lens for compensating for a saggital or tangential plane of the light and a spherical convex lens for performing compensation on the light transmitted through the cylindrical convex lens.

There is also provided a projection display device, which forms a color image from light emitted from an illumination system using a display device according to an image signal and magnifies and projects the color image on a screen. In this case, the illumination system includes a light source; a collimating lens array for making light emitted form the light source be parallel; an optical path conversion unit for reflecting the light incident in parallel from the collimating lens array back toward the light source to initially converge the light; and a secondary focusing lens disposed at a side where the light source is positioned, for converging the light, that has been reflected and converged through the optical path conversion unit, on a predetermined position.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 2:
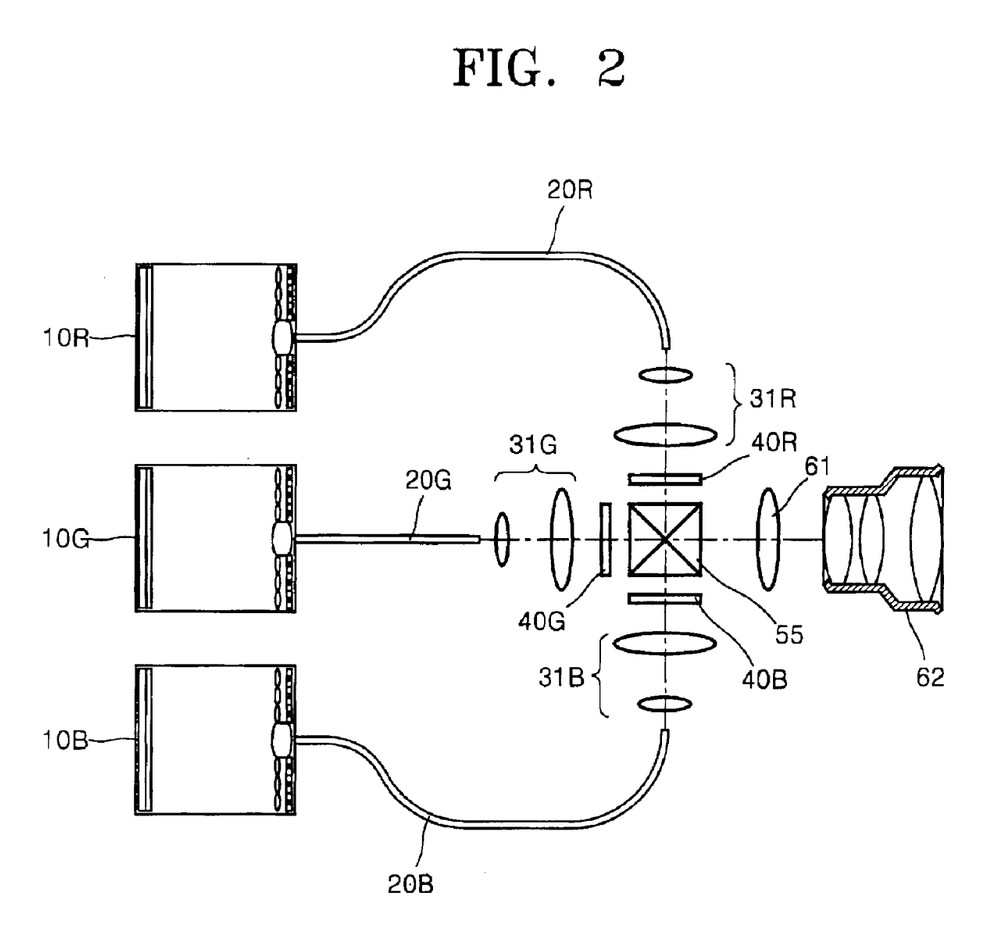
FIG. 2 is a schematic diagram of a projection display device according to one embodiment of the present invention.

Referring to FIG. 2, a projection display device according to an embodiment of the present invention includes first through third illumination systems 10R, 10G, and 10B for emitting light beams of different wavelengths; first through third display devices 40R, 40G, and 40B for processing the light beams emitted from the first through third illumination systems 10R, 10G, and 10B according to predetermined image signals to form color images, respectively; first through third optical fibers 20R, 20G, and 20B respectively disposed between the first through third illumination systems 10R, 10G, and 10B and the respective first through third display devices 40R, 40G, and 40B; an optical combining unit 55 for combining the color images formed by the first through third display devices 40R, 40G, and 40B; and a projection lens system 62 for magnifying and projecting the color image formed by the optical combining unit 55 onto a screen (not shown).

The projection display device also includes first through third collimating lens systems 31R, 31G, and 31B for making light beams emitted from the first through third optical fibers 20R, 20G, and 20B be parallel and leading the parallel light beams to the first through third display devices 40R, 40G, and 40B, respectively. Reference numeral 61 denotes a fourth focusing lens for converging the image combined by the optical combining unit 55 on the projection lens system 62.

For example, the optical combining unit 55 may be a dichroic prism. The dichroic prism selectively reflects or transmits an incident light beam according to the wavelength thereof so that R, G, and B color images incident in different directions can face one direction to be combined into one image.

The first through third illumination systems 10R, 10G, and 10B include the same elements. For example, the first, second, and third illumination systems 10R, 10G, and 10B may be designed to emit red, green, and blue light beams, respectively. It is preferable to use small light emitting devices such as laser diodes (LDs) or light emitting diodes (LEDs) for a light source employed in each of the first through third illumination systems 10R, 10G, and 10B. Here, only the first illumination system 10R will be described, and detailed descriptions of the second and third illumination systems 10G and 10B will be omitted.

Figure 3:
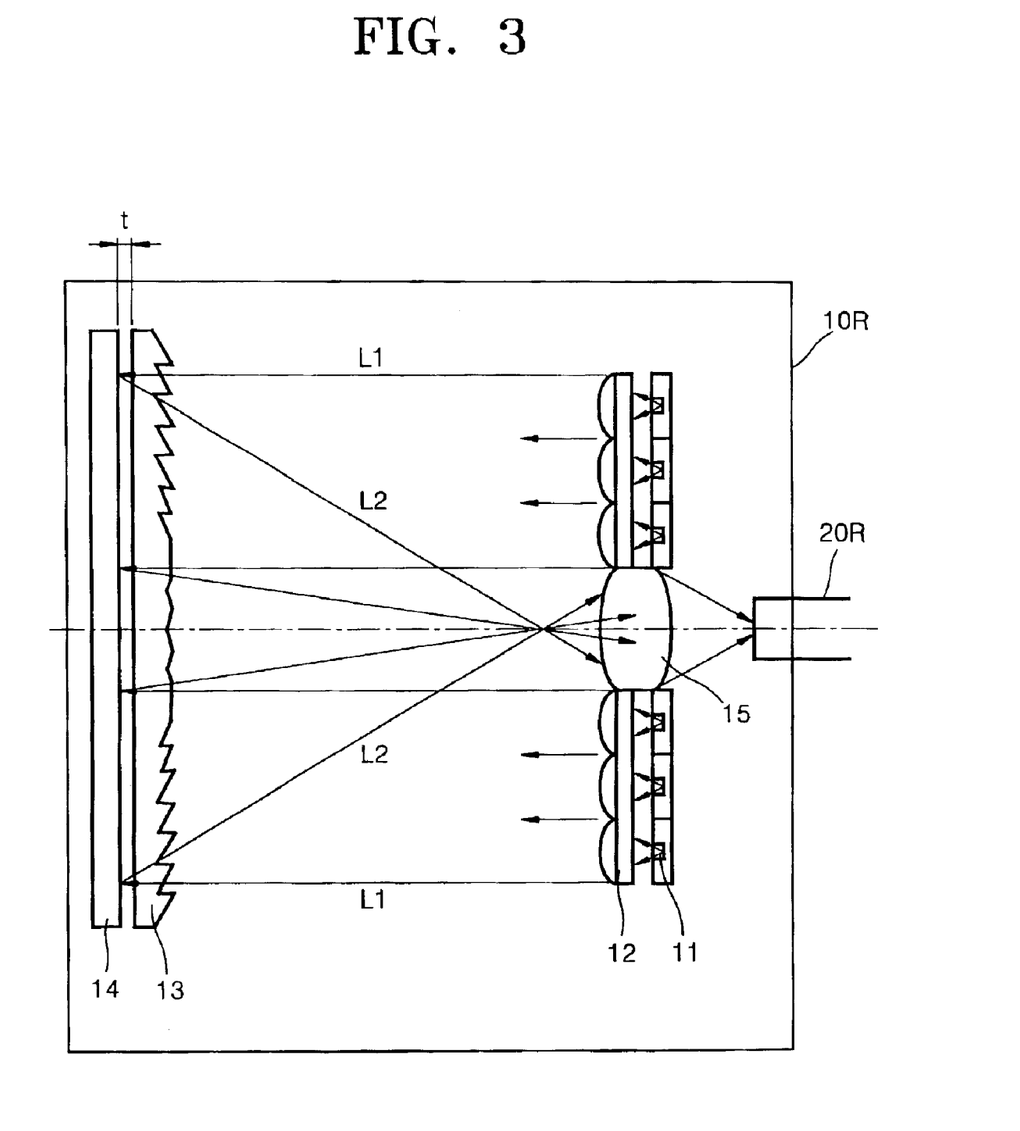
FIG. 3 is a diagram of an illumination system according to a first embodiment of the present invention.
Figure 4:
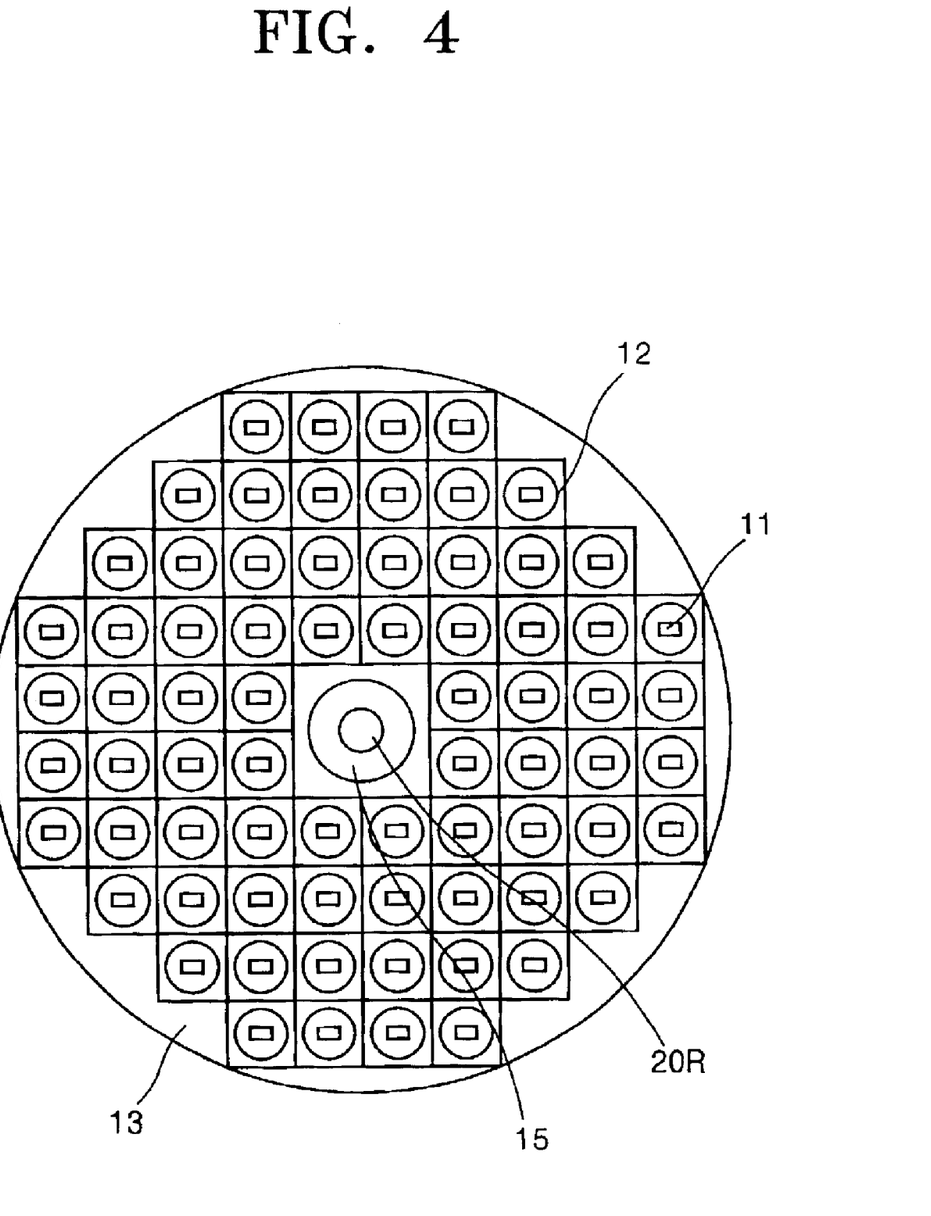
FIG. 4 is a diagram of the illumination system of FIG. 3 directly viewed from a light source.

As shown in FIGS. 3 and 4, the first illumination system 10R includes light sources 11 for emitting light beams, a collimating lens array 12 for making the light beams emitted form the light sources 11 be parallel, an optical path conversion unit having a Fresnel lens 13 for initially converging the parallel light beams incident from the collimating lens array 12 and a reflective mirror 14 for converting the travelling directions of the light beams into directions toward the light sources 11, and a secondary focusing lens 15 for converging the light beams, which have been converged by the Fresnel lens 13 and reflected from the reflective mirror 14, on the optical fiber 20R.

The light sources 11 may be formed in an array structure composed of a plurality of LEDs or LDs to generate a high power. The Fresnel lens 13 is separated from the reflective lens 14 by a predetermined gap "t". It is preferable that the gap "t" is variable. The focal length of the secondary focusing lens 15 can be adjusted by adjusting the gap "t" so that as much amount of light beams as possible can be converged on the optical fiber 20R by the secondary focusing lens 15. In addition, the Fresnel lens 13 is cheap and can be freely manufactured from a small size to a large size. As described above, the light beams are converged on the optical fiber 20R by the secondary focusing lens 15, and the converged light beams are emitted from the opposite output end of the optical fiber 20R in the form of a high power spherical light beam. Particularly, when an LD which emits a beam having an elliptical shape is used as a light source, it is necessary to shape the elliptical light beam into a spherical light beam. Here, the light beam emitted from the LD can be output in the form of high power spherical light beam via the optical fiber 20R.

In the above structure, the Fresnel lens 13 and the reflective mirror 14 are separately provided, but they may be realized as the Fresnel lens 13 having a reflective coating instead of the reflective mirror 14 on its back side in order to reflect a light beam travelling through the Fresnel lens 13 to the secondary focusing lens 15.

The present invention is characterized by a structure in which light beams emitted from the light sources 11 are reflected from the optical path conversion unit including, for example, the Fresnel lens 13 and the reflective mirror 14, to the secondary focusing lens 15 disposed at a side where the light sources 11 are disposed. In this structure, paths L1 of light beams emitted from the light sources 11 and paths L2 of light beams reflected from the optical path conversion unit to the secondary focusing lens 15 can be secured in the same space, thereby reducing the volume of the illumination system 10R. In other words, when the secondary focusing lens 15 and the optical fiber 20R are not disposed at the light source 11 side but are disposed at the opposite side around the Fresnel lens 13, since light beams transmitted through the Fresnel lens 13 go forward, much more space is needed than in the illumination system structure according to the present invention.

Figure 5A:
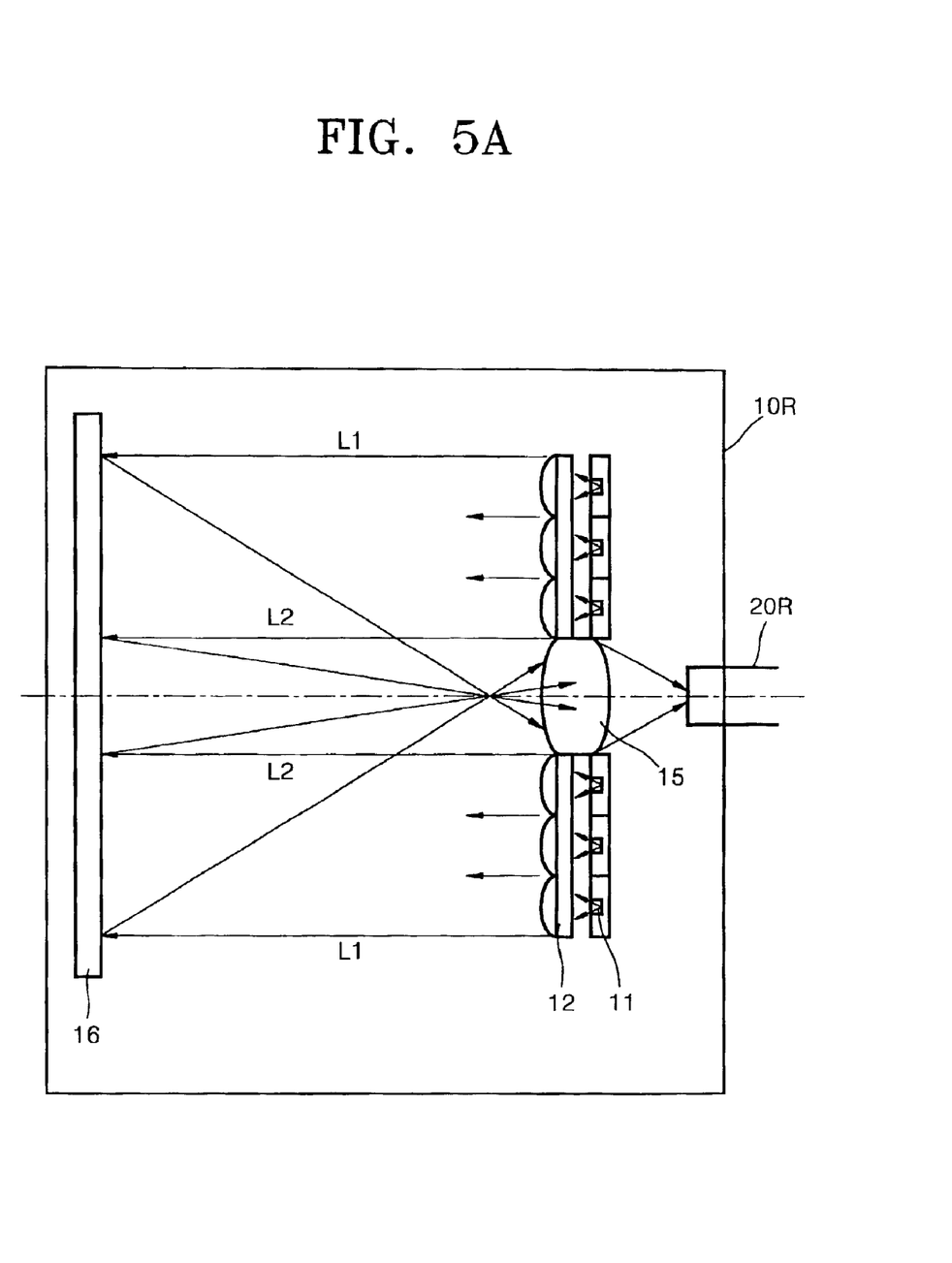
FIGS. 5A and 5B are a diagram of an illumination system according to a second embodiment of the present invention and a diagram for explaining a method of manufacturing a holographic optical element employed in the illumination system.
Figure 5B:
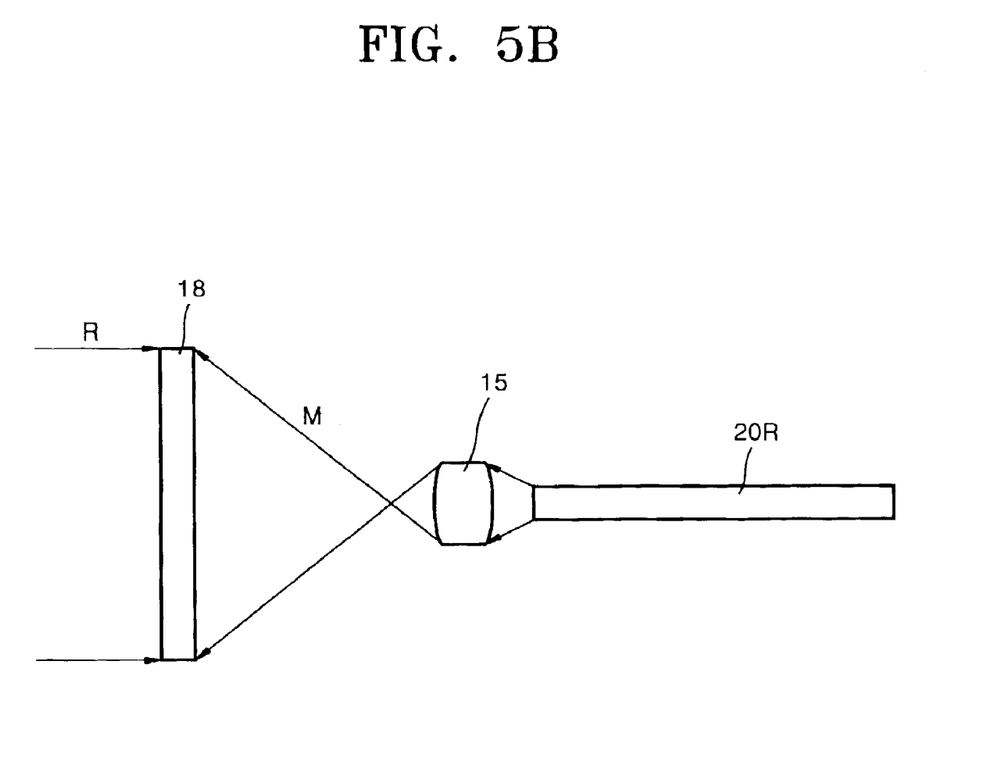

Referring to FIG. 5A, the first illumination system 10R according to a second embodiment of the present invention includes light sources 11 for emitting light beams, for example, red light beams, having a predetermined wavelength, a collimating lens array 12 for making the light beams emitted from the light sources 11 be parallel, a holographic optical element 16 for initially converging the parallel light beams by reflecting the parallel light beams toward the light sources 11, and a secondary focusing lens 15 for converging the light beams, which have been converged by the holographic optical element 16, on the optical fiber 20R. The holographic optical element 16 is an optical device that can perform the functions of both the Fresnel lens 13 and the reflective mirror 14. The holographic optical element 16 has advantages of being slim and also the low manufacturing cost. In manufacturing the holographic optical element 16, as shown in FIG. 5B, plane wave reference light R is incident on one side of a recording medium 18 on which a hologram is recorded, and object light M is incident on the opposite side thereof. The object light M passes through the optical fiber 20R and the secondary focusing lens 15, is incident on the recording medium 18, and precisely records a hologram. Thereafter, a chemical development process is performed on the recording medium 18, thereby completing a holographic optical element.

Figure 6:
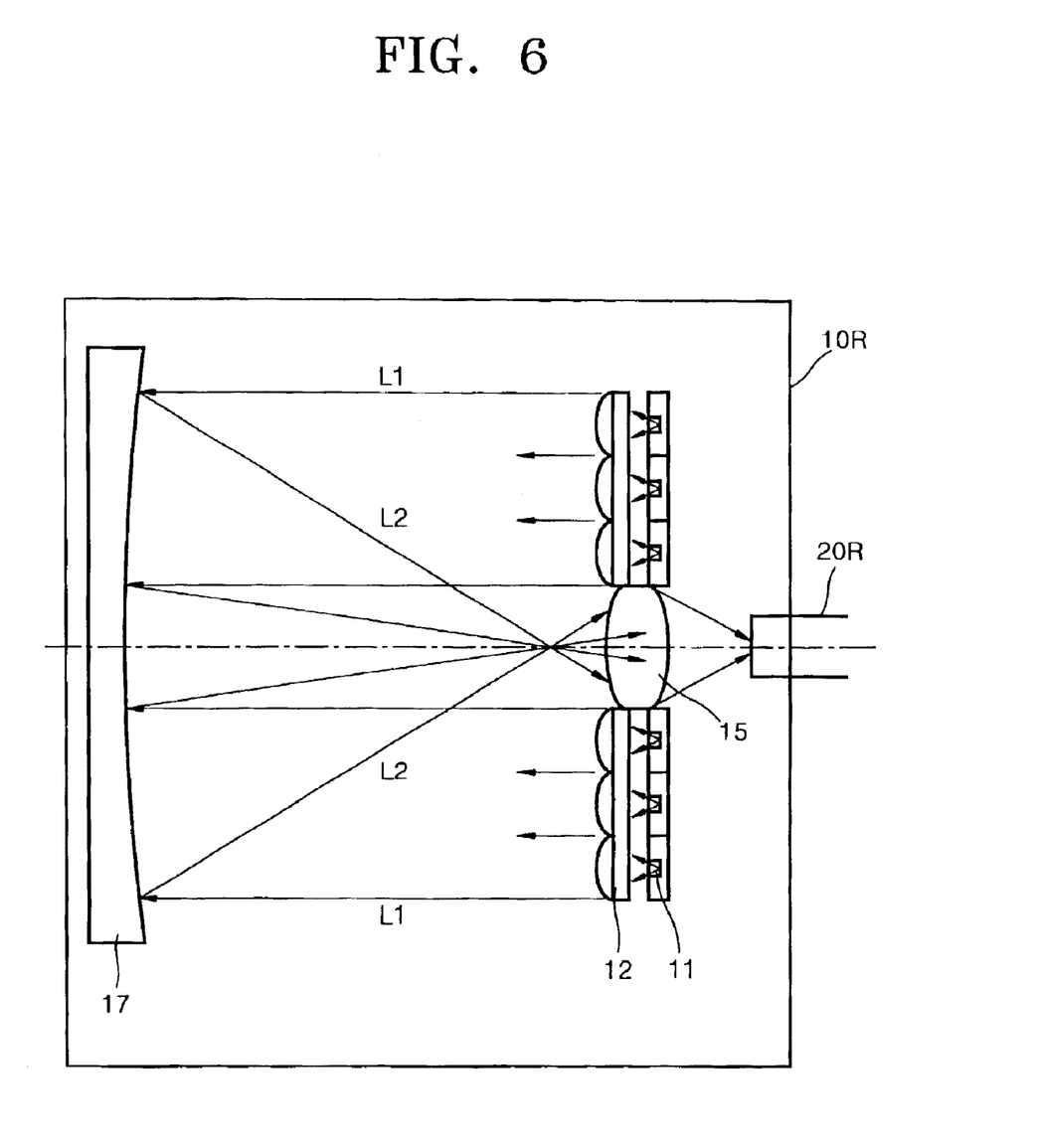
FIGS. 6 through 9 are diagrams of illumination systems according to different embodiments of the present invention.

As shown in FIG. 6, the illumination system 10R according to a third embodiment of the present invention employs a spherical concave mirror 17 instead of the holographic optical element 16 as the optical path conversion unit. Light beams incident from the light sources 11 are reflected from the spherical concave mirror 17 to the secondary focusing lens 15 at a side where the light sources 11 are disposed and converged on the first optical fiber 20R by the secondary focusing lens 15.

Figure 7:
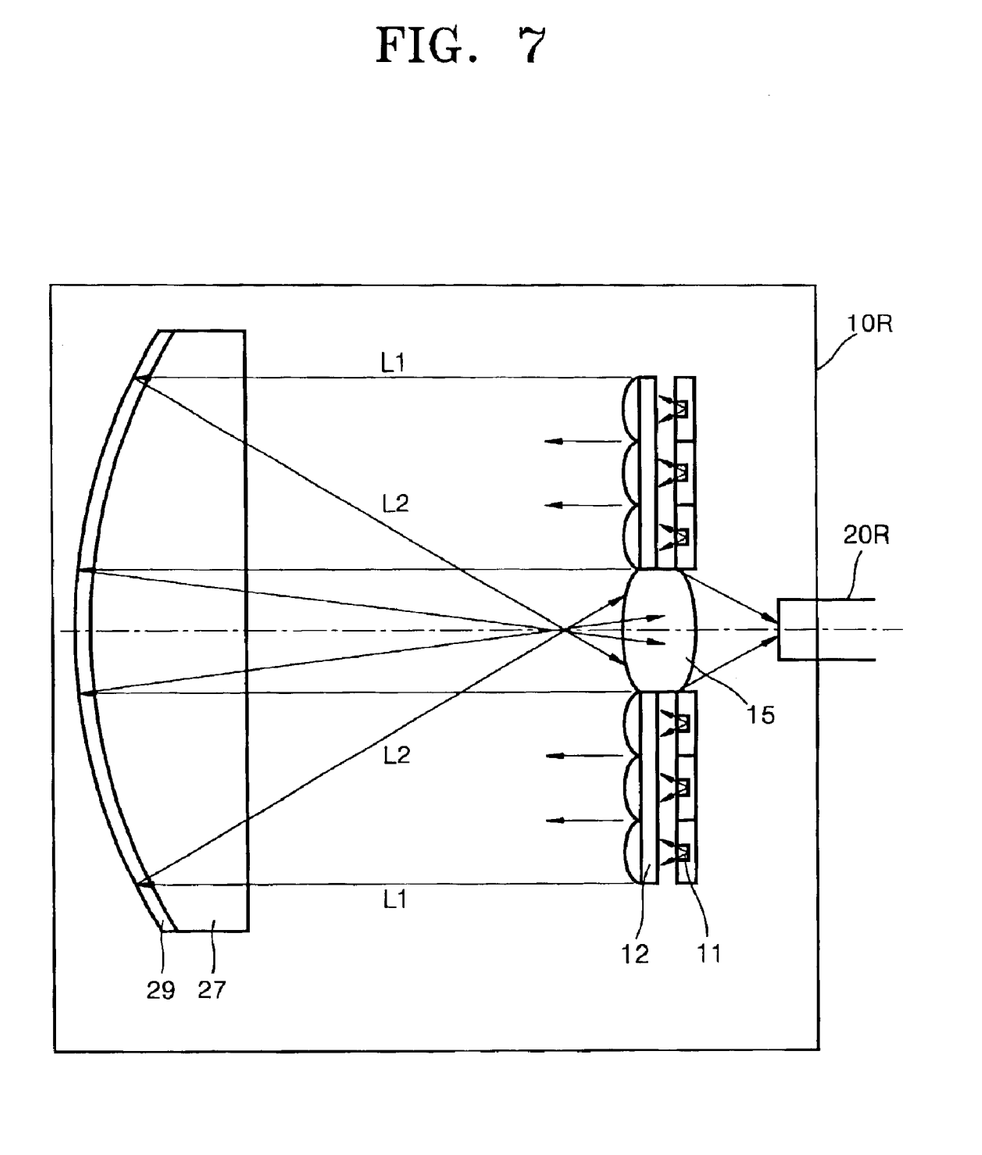
Figure 8:
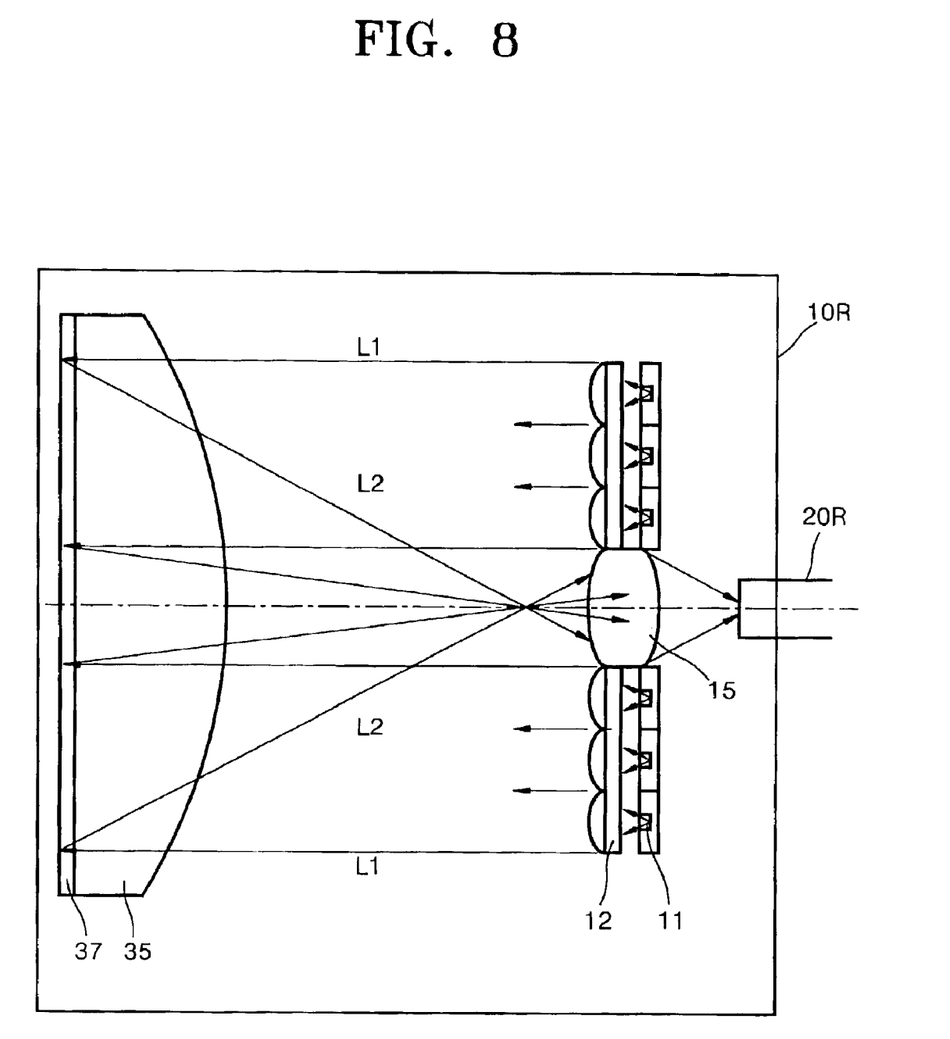
Figure 9:
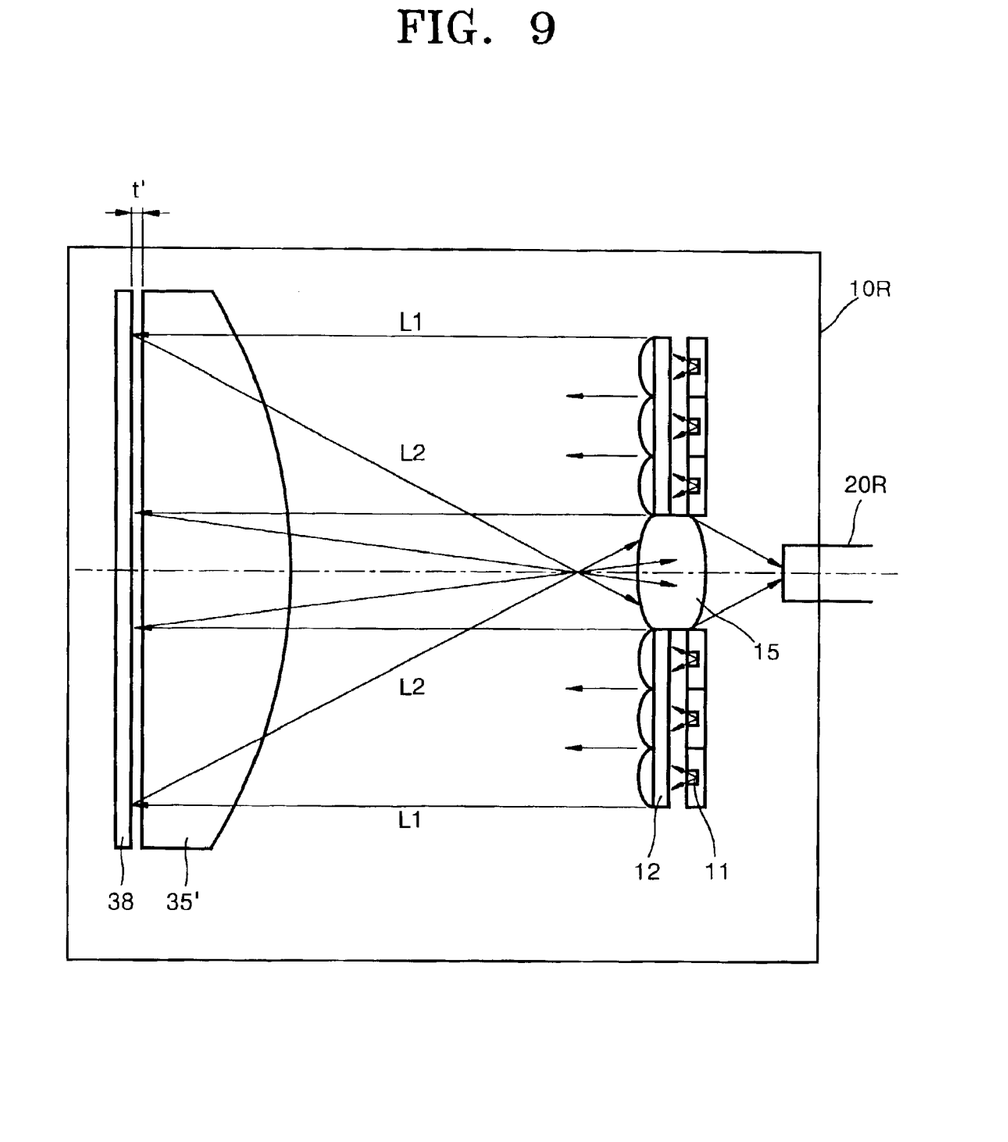

Referring to FIGS. 7 and 8, the optical path conversion unit may be composed of a first focusing lens 27 or 35 with at least one convex plane and a reflective coating 29 or 37 formed on the back of the first focusing lens 27 or 35. By forming the reflective coating 29 or 37 on the back of the first focusing lens 27 or 35, incident light beams can be reflected toward the light sources 11 and collected. Alternatively, as shown in FIG. 9, the optical path conversion unit may be composed of a first focusing lens 35' with one convex side and a reflective mirror 38 separated from the first focusing lens 35' by a predetermined gap t'. Here, the focal length of the secondary focusing lens 15 can be adjusted by adjusting the gap t' between the first focusing lens 35' and the reflective mirror 38.

Figure 10:
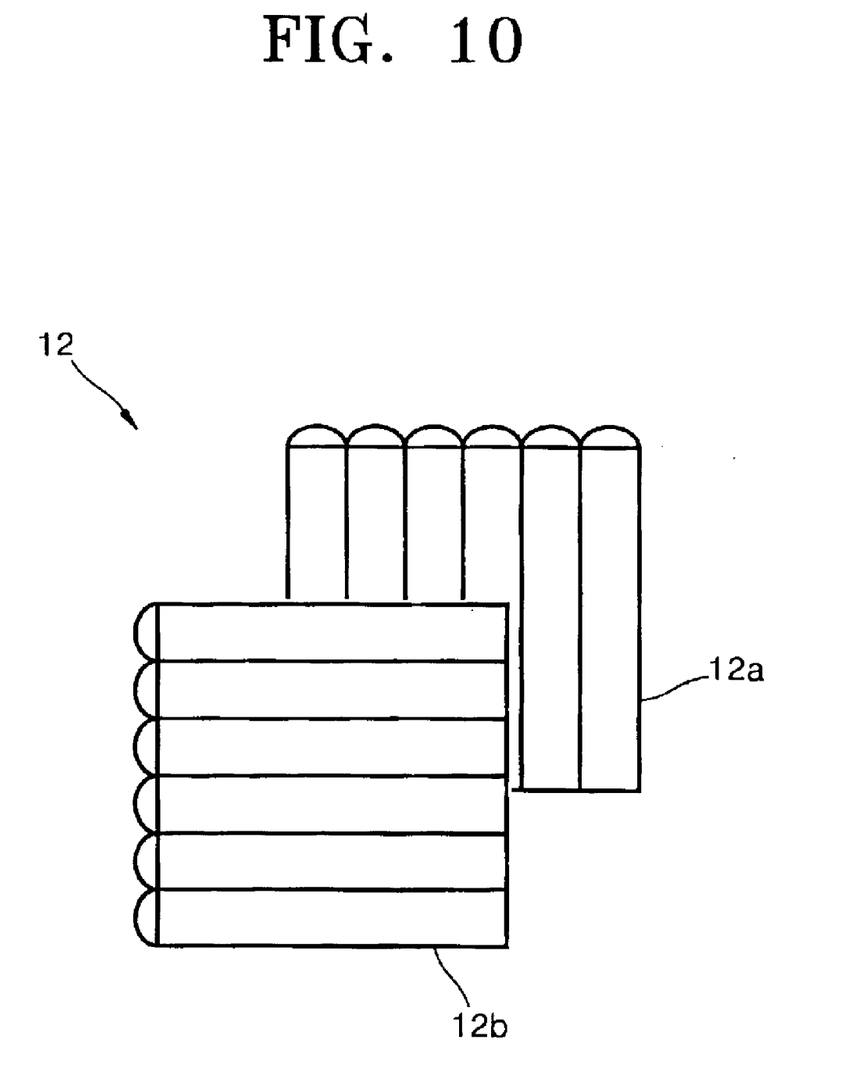
FIG. 10 is a diagram of an example of a collimating lens used in an illumination system according to the present invention.

The collimating lens array 12 may be composed of, for example, a first cylindrical convex lens 12a for compensating for the saggital plane of a light beam and a second cylindrical convex lens 12b for compensating for the tangential plane thereof, as shown in FIG. 10. Alternatively, the collimating lens array 12 may be realized as an aspherical fly-eye lens system or may be composed of a cylindrical convex lens for compensating for the saggital or tangential plane of a light beam and a spherical convex lens for performing compensation on the light beam transmitted through the cylindrical convex lens. This collimating lens array 12 is particularly suitable for shaping an elliptical light beam emitted from an LD into a parallel light beam.

In addition, loss of light can be minimized by providing the second focusing lens 15 in front of the optical fiber 20R at a side where the light sources 11 are disposed. In other words, although the quantity of light increases as the number of light sources 11 increases, the volume of the optical path conversion unit increases in proportional to the number of light sources 11, and the sectional area of light flux increases as the volume of the optical path conversion unit increases. Accordingly, as the number of light sources 11 increases, a likelihood that light, which has been reflected from the optical path conversion unit and converged, goes beyond the reception angle of the optical fiber 20R also increases. To overcome this problem in order to increase the quantity of light and minimize the loss of light, it is preferable to provide the secondary focusing lens 15 in front of optical fiber 20R.

Although the above description concerns only the first illumination system 10R emitting a red light beam, the description is applied to the second illumination system 10G emitting a green light beam and to the third illumination system 10B emitting a blue light beam in the same manner. Light beams respectively emitted from the first through third illumination systems 10R, 10G, and 10B are incident on the first through third display devices 40R, 40G, and 40B, respectively, through the respective first through third optical fibers 20R, 20G, and 20B. Before being incident on the first through third display devices 40R, 40G, and 40B, the light beams are converged and converted into parallel light beams by the first through third collimating lens systems 31R, 31G, and 31B, respectively.

Each of the first through third display devices 40R, 40G, and 40B may be a moving mirror device which forms a color image according to the on/off switching operation of a micro mirror in response to an image signal or a liquid crystal display device or liquid crystal on silicon (LCOS) which forms a color image by polarizing incident light. Color images formed by the first through third display devices 40R, 40G, and 40B are magnified and projected on a screen through the projection lens system 62.

In the above description, light sources emitting red, green, and blue color light beams are provided in independent structures, and three color light beams travelling different optical paths are combined by an optical combination unit, thereby forming a color image. Alternatively, light sources emitting red, green, and blue color light beams may be arranged in an array to form a single illumination system. The light sources can be arranged in a repeating pattern of a red light source, a green light source, and a blue light source or a group of several red light sources, a group of several green light sources, and a group of blue light sources. Here, a color image can be formed using a single-chip liquid crystal display device by sequentially performing on/off control on the light sources emitting red, green, and blue light beams.

Figure 11:
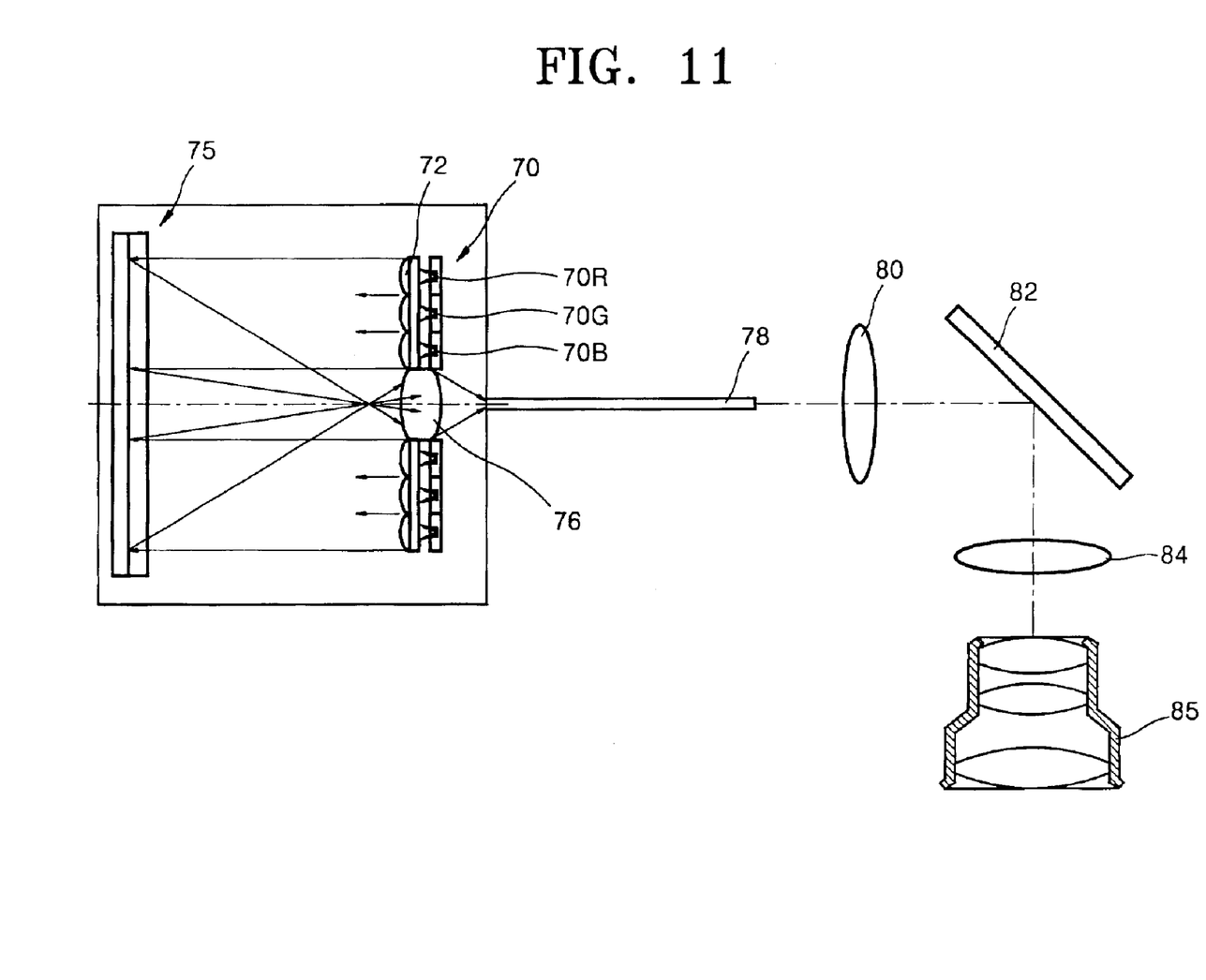
FIG. 11 is a schematic diagram of a projection display device according to another embodiment of the present invention.

Referring to FIG. 11, a projection display device employing an illumination system according to a second embodiment of the present invention includes a light source 70 including a plurality of small light emitters emitting red, green, and blue light beams in an array structure; an optical path conversion unit 75 for reflecting light of a predetermined wavelength emitted from the light source 70 toward the light source 70; and a secondary focusing lens 76 disposed at a side where the light source 70 is positioned for secondarily converging light which has been reflected and converged by the optical path conversion unit 75. The light source 70 has an array structure in which light emitters 70R, 70G, and 70B respectively emitting red, green, and blue light beams are sequentially and repeatedly arranged. The light emitters 70R, 70G, and 70B are sequentially turned on and off for light emission.

Light converged through the secondary focusing lens 76 passes through an optical fiber 78 and is incident on a display device 82. An image is formed on a projection lens unit 85 through the display device 82 and is projected on a screen (not shown). Reference numerals 80 and 84 denote a collimating lens and a focusing lens, respectively. The display device 82 may be a transmissive or reflective type, but a reflective type is used in the second embodiment of a projection display device according to the present invention. The display device 82 is an image forming device, such as a digital micro-mirror device (DMD), a reflective LCOS, or a transmissive LCD. In a case where the display device 82 is a transmissive LCD, the optical path could propagate through it and straight through the projection lens (not shown). The light sources are then modulated by the data with on/off signals of pixels in LCD. As described above, light emitters emitting red, green, and blue light beams are arranged in an array structure to form a light source, thereby simplifying the structure of an illumination system and reducing the volume thereof.

As described above, the optical path conversion unit 75 may be composed of the Fresnel lens 13 and the reflective mirror 14, may be realized as a holographic optical element 16 or a spherical concave mirror 17, or may be composed of the focusing lens 27, 35, or 35' and the reflective coating 29 or 37 or the reflective mirror 38.

As described above, in an illumination system and a projection display device according to the present invention, an array of LEDs or LDs is used as a light source so that noise and heat generated when a conventional lamp light source is used can be prevented from being generated, and the life span of a light source can be greatly increased. In addition, harmful ultraviolet or infrared rays are not emitted in the present invention. Since a Fresnel lens or holographic optical elements are used, volume and manufacturing cost can be reduced.

Particularly, light emitted from a light source is reflected back toward the light source through an optical path conversion unit so that the volumes of an illumination system and the volume of a projection display device can be greatly reduced to be compact. An optical fiber and a collimating lens array are used, thereby reducing optical loss. Particularly, in the case where a light source such as an LD emitting elliptical light is used, the elliptical light can be shaped into a high power spherical light using an optical fiber.

What is claimed is:

1. An illumination system comprising:
    a light source;
    a collimating lens array for making light emitted form the light source be parallel;
    an optical path conversion unit for reflecting the light incident in parallel from the collimating lens array back toward the light source to initially converge the light; and
    a secondary focusing lens disposed at a side where the light source is positioned, for converging the light, that has been reflected and converged through the optical path conversion unit, on a predetermined position.

2. The illumination system of claim 1, wherein the optical path conversion unit comprises:
    a Fresnel lens for converging the parallel light incident from the collimating lens array; and
    a mirror for converting a path of the light transmitted through the Fresnel lens toward the secondary focusing lens.

3. The illumination system of claim 2, further comprising an optical fiber for leading the light that has been converged through the secondary focusing lens.

4. The illumination system of claim 3, wherein the Fresnel lens is separated from the mirror by a predetermined gap, and the gap is variable.

5. The illumination system of claim 1, wherein the optical path conversion unit comprises:
    an initial focusing lens having at least one convex side; and
    a mirror for converting a path of the light transmitted through the initial focusing lens toward the secondary focusing lens.

6. The illumination system of claim 5, further comprising an optical fiber for leading the light that has been converged through the secondary focusing lens.

7. The illumination system of claim 6, wherein the initial focusing lens is separated from the mirror by a predetermined gap, and the gap is variable.

8. The illumination system of claim 1, wherein the optical path conversion unit has at least one convex plane and a reflective coating on its back side.

9. The illumination system of claim 1, wherein the optical path conversion unit is a Fresnel lens comprising a reflective coating on the back thereof so that the parallel light incident from the collimating lens array is reflected and converged.

10. The illumination system of claim 9, further comprising an optical fiber for leading the light that has been converged through the secondary focusing lens.

11. The illumination system of claim 1, wherein the optical path conversion unit is a holographic optical element.

12. The illumination system of claim 1, wherein the optical path conversion unit is a spherical concave mirror.

13. The illumination system of claim 1, wherein the light source is composed of light emitting diodes or laser diodes.

14. The illumination system of claim 13, wherein the light source has an array structure.

15. The illumination system of claim 13, wherein the light source comprises a plurality of light emitters arranged in the array structure, the light emitters emitting light of different wavelengths.

16. The illumination system of claim 13, wherein the collimating lens array comprises a first cylindrical convex lens for compensating for a saggital plane of the light and a second cylindrical convex lens for compensating for a tangential plane of the light.

17. The illumination system of claim 13, wherein the collimating lens array is an aspherical fly-eye lens system.

18. The illumination system of claim 13, wherein the collimating lens array comprises a cylindrical convex lens for compensating for a saggital or tangential plane of the light and a spherical convex lens for performing compensation on the light transmitted through the cylindrical convex lens.

19. A projection display device which forms a color image from light emitted from an illumination system using a display device according to an image signal and magnifically project the color image on a screen, wherein the illumination system comprises:

a light source;

a collimating lens array for making light emitted form the light source be parallel;

an optical path conversion unit for reflecting the light incident in parallel from the collimating lens array back toward the light source to initially converge the light; and a secondary focusing lens disposed at a side where the light source is positioned, for converging the light, that has been reflected and converged through the optical path conversion unit, on a predetermined position.

20. The projection display device of claim 19, wherein the optical path conversion unit comprises:

a Fresnel lens for converging the parallel light incident from the collimating lens array; and a mirror for converting a path of the light transmitted through the Fresnel lens toward the secondary focusing lens.

21. The projection display device of claim 20, wherein the Fresnel lens is separated from the mirror by a predetermined gap.

22. The projection display device of claim 21, further comprising an optical fiber for leading the light that has been converged through the secondary focusing lens.

23. The projection display device of claim 19, wherein the optical path conversion unit comprises:

an initial focusing lens having at least one convex side; and a mirror for converting a path of the light transmitted through the initial focusing lens toward the secondary focusing lens.

24. The projection display device of claim 23, further comprising an optical fiber for leading the light that has been converged through the secondary focusing lens.

25. The projection display device of claim 19, wherein the optical path conversion unit has at least one convex plane and a reflective coating on its back side.

26. The projection display device of claim 19, wherein the optical path conversion unit is a Fresnel lens comprising a reflective coating on the back thereof so that the parallel light incident from the collimating lens array is reflected and converged.

27. The projection display device of claim 19, wherein the optical path conversion unit is a holographic optical element.

28. The projection display device of claim 19, wherein the optical path conversion unit is a spherical concave mirror.

29. The projection display device of claim 19, further comprising an optical fiber for leading the light that has been converged through the secondary focusing lens.

30. The projection display device of claim 19, wherein the light source is composed of light emitting diodes or laser diodes.

31. The projection display device of claim 30, wherein the light source has an array structure.

32. The projection display device of claim 30, wherein the light source comprises a plurality of light emitters arranged in the array structure, the light emitters emitting light of different wavelengths.

33. The projection display device of claim 30, wherein the collimating lens array comprises a first cylindrical convex lens for compensating a saggital plane of the light and a second cylindrical convex lens for compensating a tangential plane of the light.

34. The projection display device of claim 30, wherein the collimating lens array is an aspherical fly-eye lens system.

35. The projection display device of claim 30, wherein the collimating lens array comprises a cylindrical convex lens for compensating for a saggital or tangential plane of the light and a spherical convex lens for performing compensation on the light transmitted through the cylindrical convex lens.

* * * * *